(12) United States Patent
Suezawa

(10) Patent No.: US 10,365,880 B2
(45) Date of Patent: Jul. 30, 2019

(54) DATA PROCESSING APPARATUS, DATA PROCESSING METHOD, AND NON-TRANSITORY COMPUTER READABLE MEDIUM

(71) Applicant: FUJI XEROX CO., LTD., Tokyo (JP)

(72) Inventor: Yoshihito Suezawa, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 259 days.

(21) Appl. No.: 15/299,032

(22) Filed: Oct. 20, 2016

(65) Prior Publication Data

US 2017/0351477 A1   Dec. 7, 2017

(30) Foreign Application Priority Data

Jun. 1, 2016  (JP) ................................ 2016-109805

(51) Int. Cl.
  *G06F 3/14*     (2006.01)
  *G06F 3/0484*   (2013.01)
  *G06F 16/00*    (2019.01)

(52) U.S. Cl.
  CPC .......... *G06F 3/1454* (2013.01); *G06F 3/0484* (2013.01); *G06F 3/04842* (2013.01); *G06F 3/1438* (2013.01); *G06F 16/00* (2019.01); *G09G 2360/06* (2013.01)

(58) Field of Classification Search
  CPC .................. G06F 3/04855; H04N 1/00411
  USPC .................................. 715/765, 740, 741, 780
  See application file for complete search history.

(56) References Cited

U.S. PATENT DOCUMENTS

| 9,971,493 B2 * | 5/2018 | Murata ............... G06F 3/04855 |
| 2014/0320897 A1 * | 10/2014 | Takahashi .......... H04N 1/00411 |
| | | 358/1.15 |

FOREIGN PATENT DOCUMENTS

| JP | 2009-053845 A | 3/2009 |
| JP | 2010-079342 A | 4/2010 |

* cited by examiner

*Primary Examiner* — Cao H Nguyen
(74) *Attorney, Agent, or Firm* — Oliff PLC

(57) ABSTRACT

A data processing apparatus includes a first display controller that displays on a first display region of a display an operation screen for an operation of another apparatus connected to the data processing apparatus via a network, and displays on a second display region of the display an operation screen that operates a first object selected from a set of at least one object related to the operation, a memory controller that stores on a memory at a predetermined timing an image of the operation screen displayed on the first display region with the first object associated with the image of the operation screen, and a second display controller that, when a predetermined operation is performed on the first object or the set, displays the image associated with the first object on the display.

20 Claims, 9 Drawing Sheets

FIG. 6

| | PERSON A | PERSON B | XXX | XXX |
|---|---|---|---|---|
| SUBJECT NAME | | | | |

SOLUTION DEVELOPMENT DIVISION  DIVISION AGENDA

T1

TIME AND DATE OF PRODUCTION
PROJECT CODE  T2
GROUP NAME

R1
XXX
OXXX
OXXX

G1

| ITEM NAME | CONTENTS | TYPE |
|---|---|---|
| PRODUCTION TIME AND DATE | TIME INFORMATION OF SCREEN SHOT PRODUCTION | DATE/TIME |
| URL | URL OF COOPERATION DESTINATION SYSTEM | String |

FIG. 13

DATA PROCESSING APPARATUS, DATA PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-109805 filed Jun. 1, 2016.

BACKGROUND

Technical Field

The present invention relates to a data processing apparatus, a data processing method, and a non-transitory computer readable medium.

SUMMARY

According to an aspect of the invention, there is provided a data processing apparatus. The data processing apparatus includes a first display controller that displays on a first display region of a display an operation screen for an operation of another apparatus connected to the data processing apparatus via a network, and displays on a second display region of the display an operation screen that operates a first object selected from a set of at least one object related to the operation, a memory controller that stores on a memory at a predetermined timing an image of the operation screen displayed on the first display region with the first object associated with the image of the operation screen, and a second display controller that, when a predetermined operation is performed on the first object or the set, displays the image associated with the first object on the display.

BRIEF DESCRIPTION OF THE DRAWINGS

Exemplary embodiments of the present invention will be described in detail based on the following figures, wherein:

FIG. 6 illustrates an example of a system operation screen;
FIG. 13 illustrates an example of a screen displayed on the UI unit;

DETAILED DESCRIPTION

Figure 1:
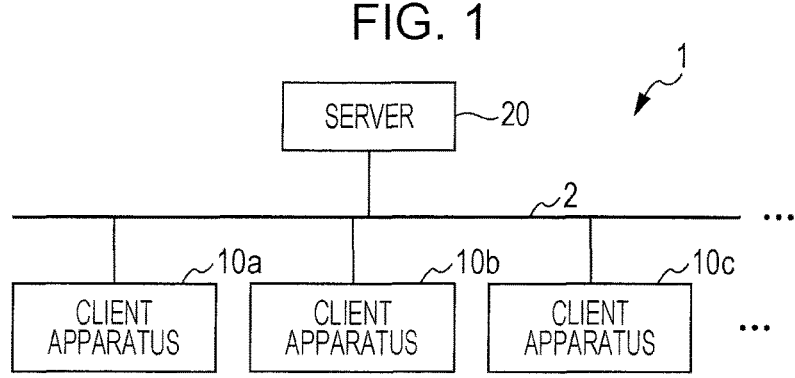
FIG. 1 illustrates a configuration of a system.

FIG. 1 is a block diagram illustrating a configuration of a system 1 of an exemplary embodiment. The system 1 includes client apparatuses 10*a*, 10*b*, 10*c*, . . . , and a server 20. The client apparatuses 10*a*, 10*b*, 10*c*, . . . are operated by users, and may be personal computers, for example. If there is no need to differentiate the client apparatuses 10*a*, 10*b*, 10*c*, . . . from each other, these are collectively referred to as "a client apparatus 10". The server 20 provides a variety of services, such as storing data. FIG. 1 illustrates a single server 20, but multiple servers may provide the services. In the following discussion, the service provided by the server 20 is referred to as a "coordination destination system". A communication network 2 includes at least one of the Internet, a mobile communication network, and a telephone network. The communication network 2 connects to the client apparatus 10 and the server 20.

Figure 2:
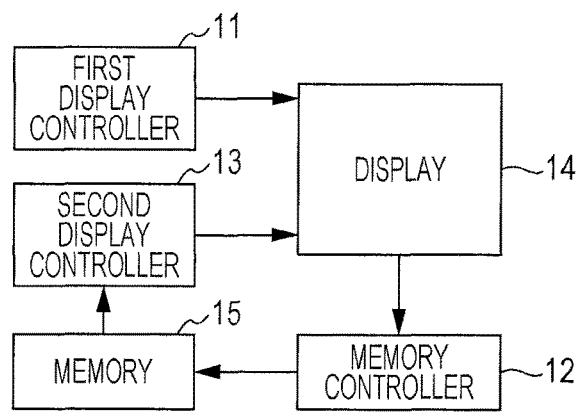
FIG. 2 illustrates a functional configuration of a client apparatus.

FIG. 2 illustrates a functional configuration of the client apparatus 10 (an example of a data processing apparatus). The client apparatus 10 includes a first display controller 11, a memory controller 12, and a second display controller 13. The first display controller 11 displays on a first display region of a display 14 an operation screen for an operation of another apparatus connected to the client apparatus 10 via a network, and displays on a second display region of the display 14 an operation screen for operating a first object that is selected from a set of at least one object related to the operation. At a predetermined timing, the memory controller 12 stores on a memory 15 the image of the operation screen displayed on the first display region in association with the first object. When a predetermined operation is performed on the first object or the set, the second display controller 13 displays the image associated with the first object on the display 14.

Figure 3:
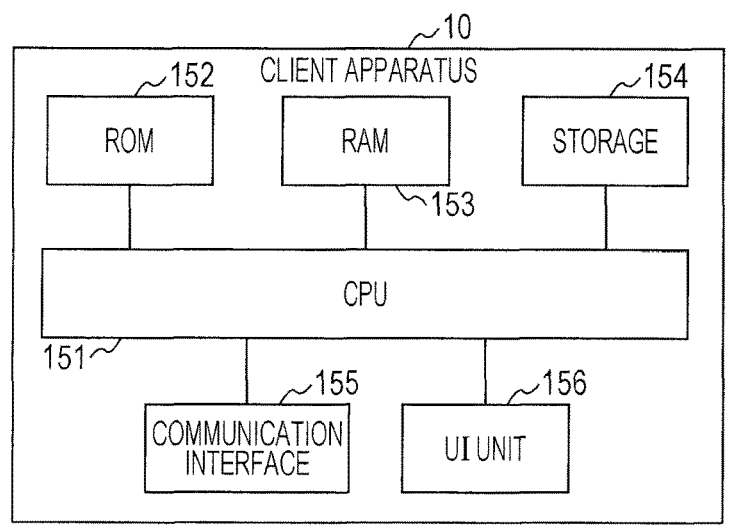
FIG. 3 illustrates a hardware configuration of the client apparatus.

FIG. 3 illustrates an example of a hardware configuration of the client apparatus 10. The client apparatus 10 includes a central processing unit (CPU) 151, a read-only memory (ROM) 152, a random-access memory (RAM) 153, a storage 154, a communication interface 155, and a user interface (UI) unit 156. The CPU 151 is a control device (processor) that controls elements of the client apparatus 10. The ROM 152 is a non-volatile storage device that stores programs and data. The RAM 153 is a volatile memory device that functions as a working area when the CPU 151 executes a program. The storage 154 is an auxiliary non-volatile storage device that stores programs and data. The communication interface 155 communicates via the communication network 2. In this case, the communication interface 155 specifically communicates with the server 20. The UI unit 156 includes a touch screen and keys, for example.

The CPU 151 implements the functions illustrated in FIG. 2 by executing the program stored on the storage 154. The CPU 151 executing the program is an example of each of the first display controller 11, the memory controller 12, and the second display controller 13. The UI unit 156 is an example of the display 14. The storage 154 is an example of the memory 15.

Figure 4:
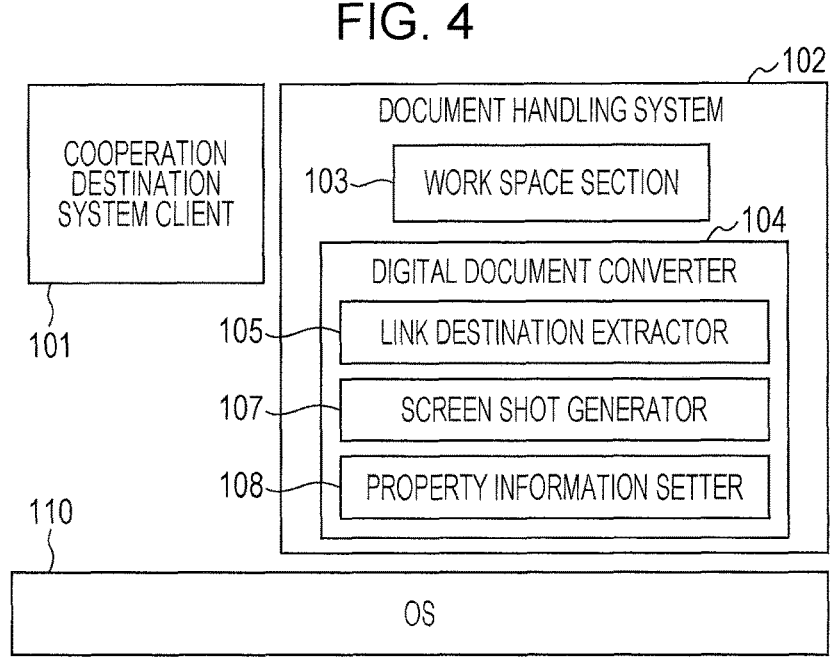
FIG. 4 illustrates an example of a software configuration of the client apparatus.

FIG. 4 illustrates an example of a software configuration of the client apparatus 10. As illustrated in FIG. 4, a cooperation destination system client 101 and a document handling system 102 are applications pre-installed on the client apparatus 10, and operate on an operating system (OS) 110. The cooperation destination system client 101 is the application that displays on the UI unit 156 an operation screen of the cooperation destination system (an operation screen of an operation of the server 20), and may be a browser, for example. The document handling system 102 is an application that manages files and folders. The document handling system 102 includes a work space section 103 and a digital document converter 104. The work space section 103 is a folder that stores files and tools. The work space section 103 stores not only files and folders, but also a tool that performs an operation on the files or folders (such as a file format conversion operation or a character recognition operation). The work space section 103 is an example of a set of at least one object related to the cooperation destination system (for example, the set includes files, and folders).

The digital document converter 104 is an element that performs an operation to digitally document a screen shot of the screen of the cooperation destination system. The digital document converter 104 includes a link destination extractor 105, a screen shot generator 107, and a property information setter 108. The link destination extractor 105 performs an operation to extract a link destination (such as a uniform resource locator (URL)) of the screen of the cooperation destination system. The screen shot generator 107 generates the screen shot of the operation screen of the cooperation destination system. The property information setter 108 updates the screen shot and the property information of each file.

Operation Example 1

A user performs a job on the cooperation destination system using the client apparatus 10. In this case, the user performs the job using a file or folder stored on the work space section 103 in the client apparatus 10. The user first starts up the document handling system 102 using the UI unit 156. The OS 110 implemented by the CPU 151 starts up the document handling system 102 in accordance with information output from the UI unit 156. The document handling system 102 displays the operation screen of the document handling system 102 on the UI unit 156. In the following discussion, the operation screen of the document handling system 102 is referred to as a "local operation screen" for convenience of explanation.

Figure 5:
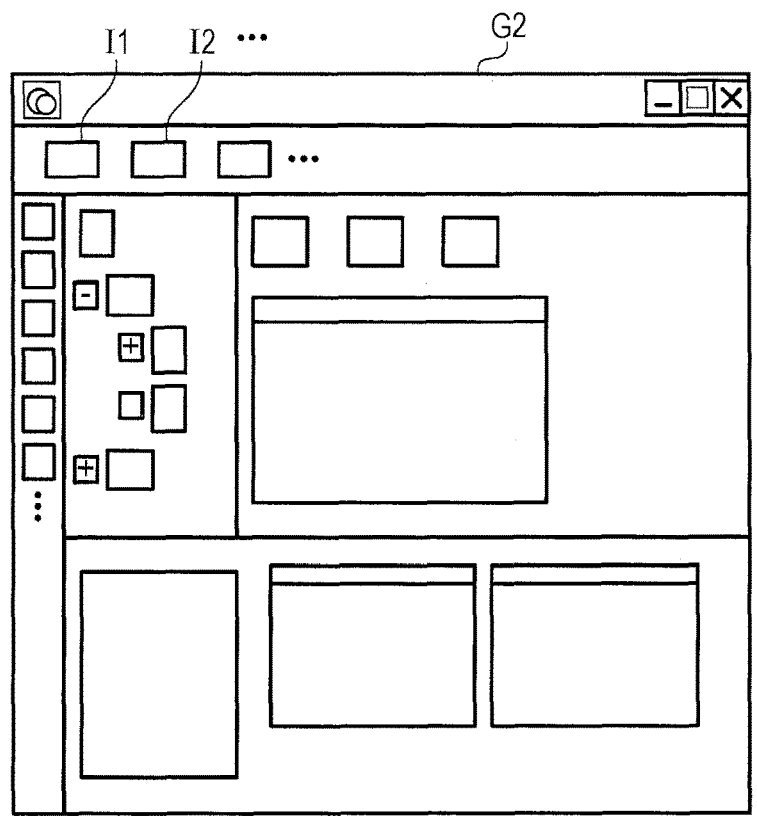
FIG. 5 illustrates an example of a local operation screen.

FIG. 5 illustrates an example of the local operation screen G2. The local operation screen G2 is an example of the operation screen to operate an object selected from the work space section 103. The local operation screen G2 includes an image (such as an icon) to access the operation screen of the cooperation destination system, and an icon indicating a file or folder included in the work space section 103. The local operation screen G2 also includes icons (image objects) I1, I2, . . . that instructs operations to be performed on the files and folders in the work space section 103. When the user performs an operation on the local operation screen G2 to select an image to access the operation screen of the cooperation destination system, the document handling system 102 requests the OS 110 to start up the cooperation destination system client 101 and to access the cooperation destination system. In response to the request from the document handling system 102, the OS 110 starts up the cooperation destination system client 101. The cooperation destination system client 101 accesses the address of the cooperation destination system and displays the operation screen of the cooperation destination system on the UI unit 156. In the following discussion, the operation screen of the cooperation destination system is referred to as a "system operation screen" for convenience of explanation.

FIG. 6 illustrates an example of a system operation screen G1. The system operation screen G1 includes text boxes T1, T2, . . . , the user inputs text into, and a radio button R1 the user uses to select one of multiple items. The user may input text or select an item on the system operation screen using the UI unit 156. In accordance with the exemplary embodiment, each time the user inputs text or selects an item, and the system operation screen is updated in response to screen shifting, such a change is notified to the document handling system 102 via the OS 110.

The user inputs a variety of information on the system operation screen, and performs a job by opening a file or folder stored on the work space section 103. For example, the user may open a document file included in the work space section 103 and input text while referring to the contents of the document file. The user may also perform an operation on the system operation screen to transmit a file included in the work space section 103 to the server 20.

Figure 7:
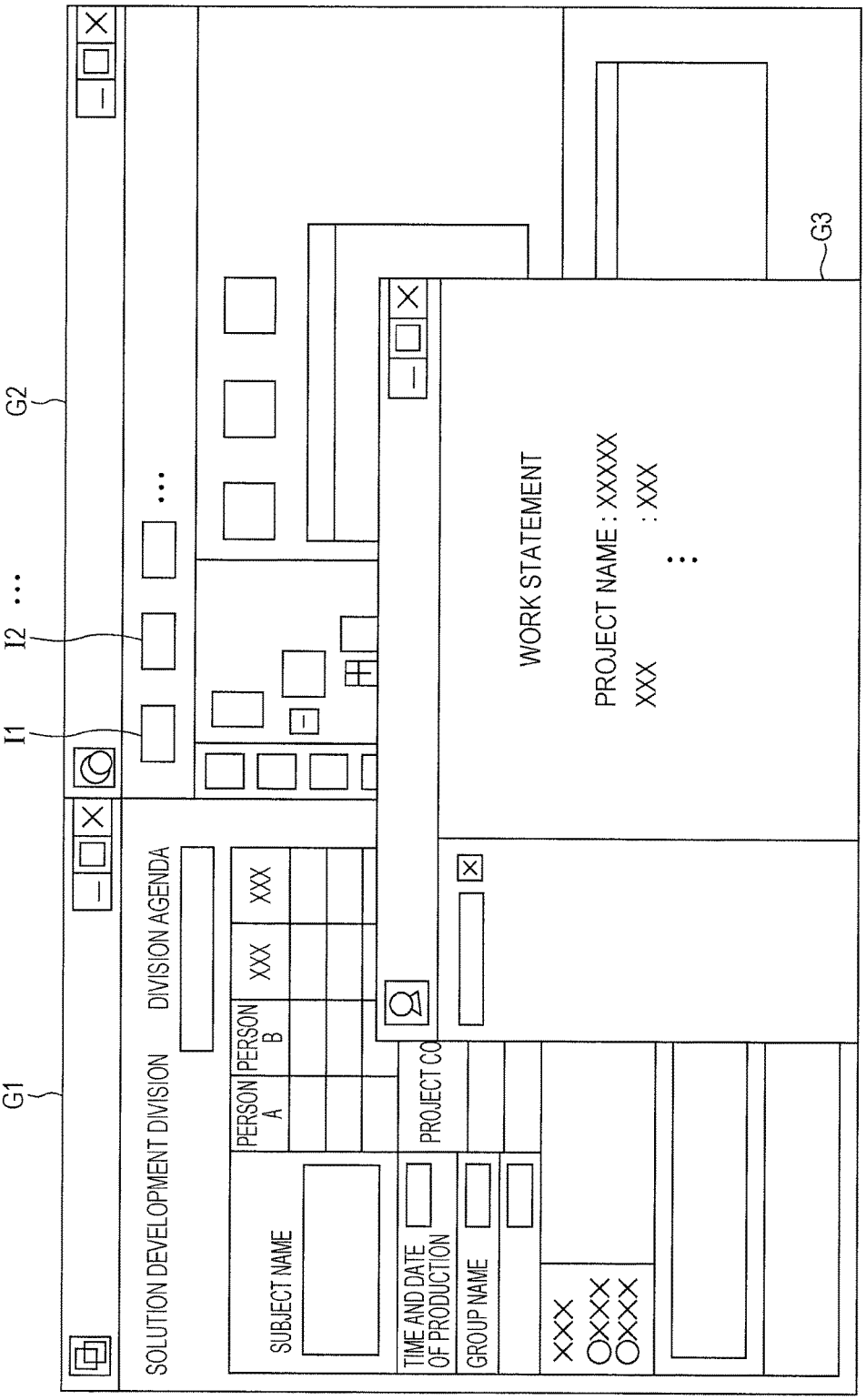
FIG. 7 illustrates an example of a screen displayed on a user interface (UI) unit.

FIG. 7 illustrates an example of a screen displayed on the UI unit 156. In the example of FIG. 7, the system operation screen G1, local operation screen G2, and document file G3 are displayed on the UI unit 156. The display region having the system operation screen G1 displayed thereon is an example of a first display region in an exemplary embodiment of the present invention. The display region having the local operation screen G2 displayed thereon is an example of a second display region of an exemplary embodiment of the present invention.

If the cooperation destination system client 101 is started up on the operation screen of the document handling system 102 in the exemplary embodiment, the OS 110 notifies the document handling system 102 of the updating of the system operation screen and information related to the system operation screen (such as a display position and a display size of the operation screen).

Figures 8, 9:
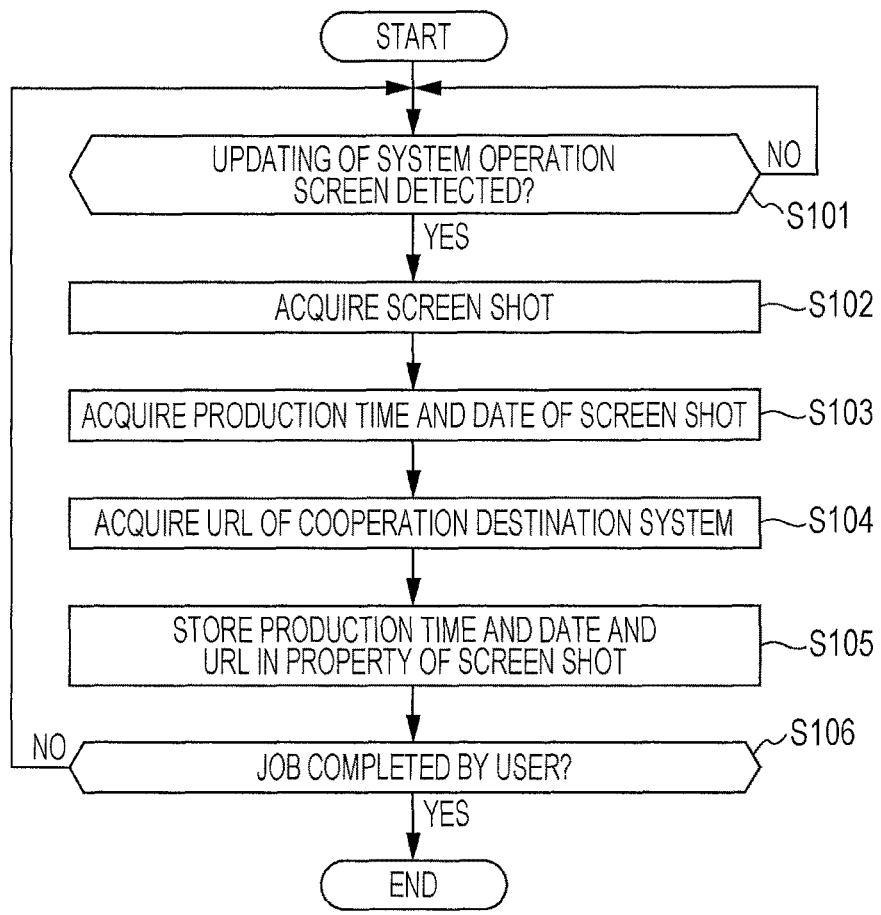
FIG. 8 is a flowchart illustrating a storage process of a screen shot.
FIG. 9 illustrates an example of contents of a property of the screen shot.

FIG. 8 is a flowchart illustrating a storage process of a screen shot to be performed by the document handling system 102. In step S101, the document handling system 102 determines whether the updating of the system operation screen has been detected. Upon determining that the updating has been detected, the document handling system 102 proceeds to step S102. If the updating has not been detected, the document handling system 102 returns to step S101, and waits on standby until the updating has been detected.

In step S102, the document handling system 102 acquires the screen shot of the system operation screen (hereinafter simply referred to as a "screen shot"). In accordance with the exemplary embodiment, the document handling system 102 acquires from the OS 110 information related to the display region of the operation screen of the cooperation destination system client 101 started up by the document handling system 102, and, using the acquired information, requests the OS 110 to acquire the screen shot of the display region of the system operation screen. In response to the request from the document handling system 102, the OS 110 generates the screen shot of the system screen, and then hands the screen shot over to the document handling system 102.

In step S103, the document handling system 102 acquires production time and date of the screen shot. In step S104, the document handling system 102 acquires an address responsive to the system operation screen. In accordance with the exemplary embodiment, the document handling system 102 acquires a uniform resource locator (URL) of the system operation screen. In step S105, the document handling system 102 stores time information acquired in step S103 and indicating the production time and date, and the URL acquired in step S104 on the property of the screen shot.

FIG. 9 illustrates an example of contents of the property of the screen shot. Referring to FIG. 9, the property of the screen shot includes the "production time and date" and "URL". Used as the "production time and date" is time information that indicates the time and date on which the screen shot is produced. Used as the "URL" is a source URL of the screen of the screen shot. The screen shot acquired in steps S102 through S105 of FIG. 8 is temporarily stored on a predetermined memory area of the storage 154.

In step S106, the document handling system 102 determines whether the user has completed the job. For example, when the system operation screen is closed, the document handling system 102 may determine that the user has completed the job. If the document handling system 102 determines in step S106 that the user has completed the job, the document handling system 102 ends the process. If the document handling system 102 determines that the user has not completed the job, the document handling system 102 returns to step S101.

Figures 10, 11:
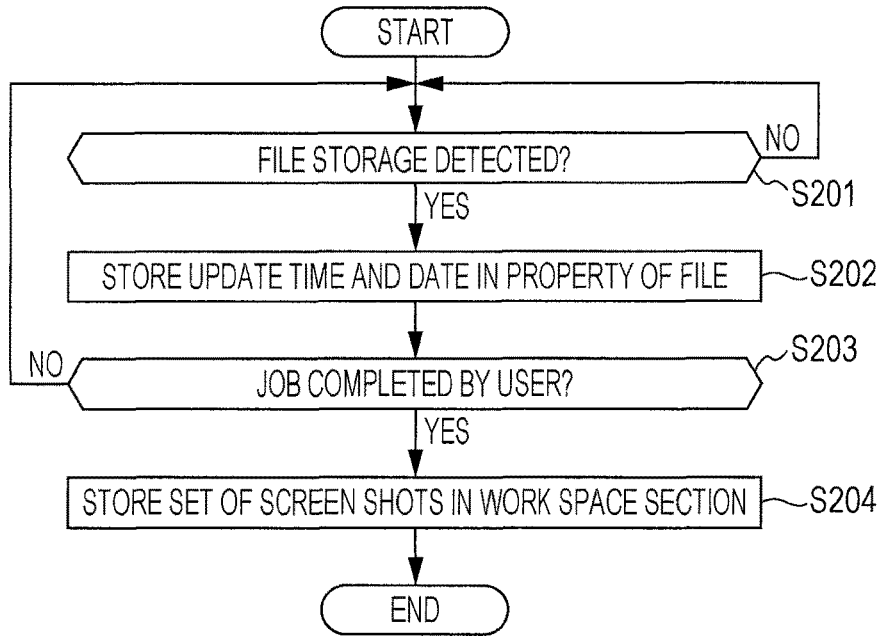
FIG. 10 is a flowchart illustrating a storage process of a file.
FIG. 11 illustrates an example of contents of a property of a file.

FIG. 10 is a flowchart illustrating a storage process of a file to be performed by the document handling system 102. The process of FIG. 10 and the process of FIG. 8 are performed in parallel by the document handling system 102. In step S201, the document handling system 102 determines whether the storage of a file has been detected. Upon determining that the storage of the file has been detected, the document handling system 102 proceeds to step S202. Upon determining that the storage of the file has not been detected, the document handling system 102 returns to step S201 and waits on standby until the storage of the file has been detected.

In step S202, the document handling system 102 stores the property of the stored file with the time information indicating the update time and date attached thereto.

FIG. 11 illustrates an example of contents of the property of a file. Referring to FIG. 11, the time information including multiple times and dates is included in the property of the file. In accordance with the exemplary embodiment, time information indicating the update time and date is added to the property of the file each time the file stored on the work space section 103 is updated.

Turning back to FIG. 10, the document handling system 102 determines in step S203 whether the user has completed the job. For example, when the local operation screen is closed, the document handling system 102 may determine that the user has completed the job. In another example, when the file stored on the work space section 103 of the document handling system 102 is closed, the document handling system 102 may determine that the user has completed the job. In yet another example, when a displayed page of a document file is changed to another page with the document file included in the work space section 103 displayed on the UI unit 156, the document handling system 102 may determine that the user has completed the job. Upon determining in step S203 that the user has completed the job, the document handling system 102 proceeds to step S204. Upon determining in step S203 that the user has not completed the job, the document handling system 102 returns to step S201.

In step S204, the document handling system 102 stores on a memory area allocated for the work space section 103 a set of screen shots acquired in steps S102 through S105 of FIG. 8. The screen shot stored on the work space section 103 and the object in the work space section 103 are associated with each other via a relationship between the update time and date of the screen shot and the update time and date of the object. More specifically, in accordance with the exemplary embodiment, when the document handling system 102 determines in response to an operation, such as the closing of the local operation screen, that the user has completed the job, the acquired screen shot is associated with the object and then stored on the work space section 103. The storage of the screen shot and the object in association is intended to refer to storing at least one of the screen shot and the object with information indicating the relationship therebetween (the update time and date in the above example) attached thereto. Subsequent to the operation in step S204, the document handling system 102 simply ends the process.

The user may suspend the job using the cooperation destination system for some reason. In such a case, the user closes the system operation screen or the local operation screen. If the user resumes the job again later, the user then opens the system operation screen or the local operation screen again. In other words, the user selects one of the files or folders stored on the work space section 103 using the local operation screen.

Figure 12:
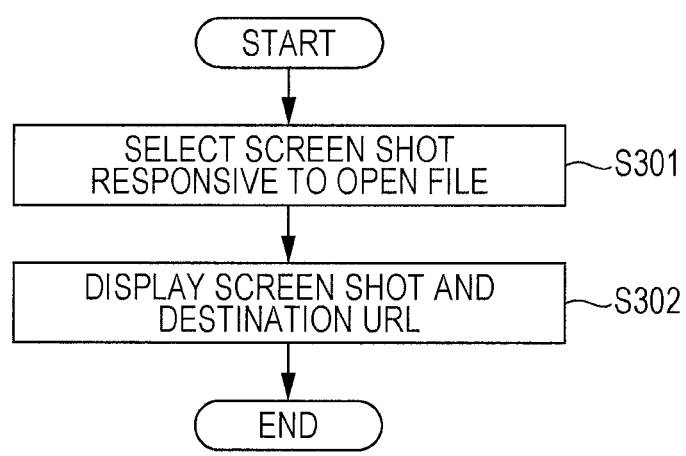
FIG. 12 is a flowchart illustrating a display process of the screen shot.

FIG. 12 is a flowchart illustrating a process that is performed when the job is resumed. The process of FIG. 12 is triggered by the opening of a file in the work space section 103. In step S301, the document handling system 102 compares the production time and date of the screen shot stored on the work space section 103 with the update time and date of the open file, and selects the screen shot having a time difference from the update time and date of the file satisfying a specific condition. More specifically, the document handling system 102 may select the screen shot with the production time and date having a minimum difference from the update time and date of the file. Alternatively, the document handling system 102 may select the screen shot having a time difference from the update time and date of the file equal to or smaller than a predetermined threshold value.

In step S302, the document handling system 102 displays the screen shot selected in step S301 on the UI unit 156 while also displaying on the UI unit 156 the system operation screen that is obtained by accessing a URL attached to the selected screen shot. In other words, when the user performs the operation to select one of the files or folders stored on the work space section 103 in the exemplary embodiment, the document handling system 102 displays on the UI unit 156 the screen shot associated with the selected file or folder.

Figure 13:
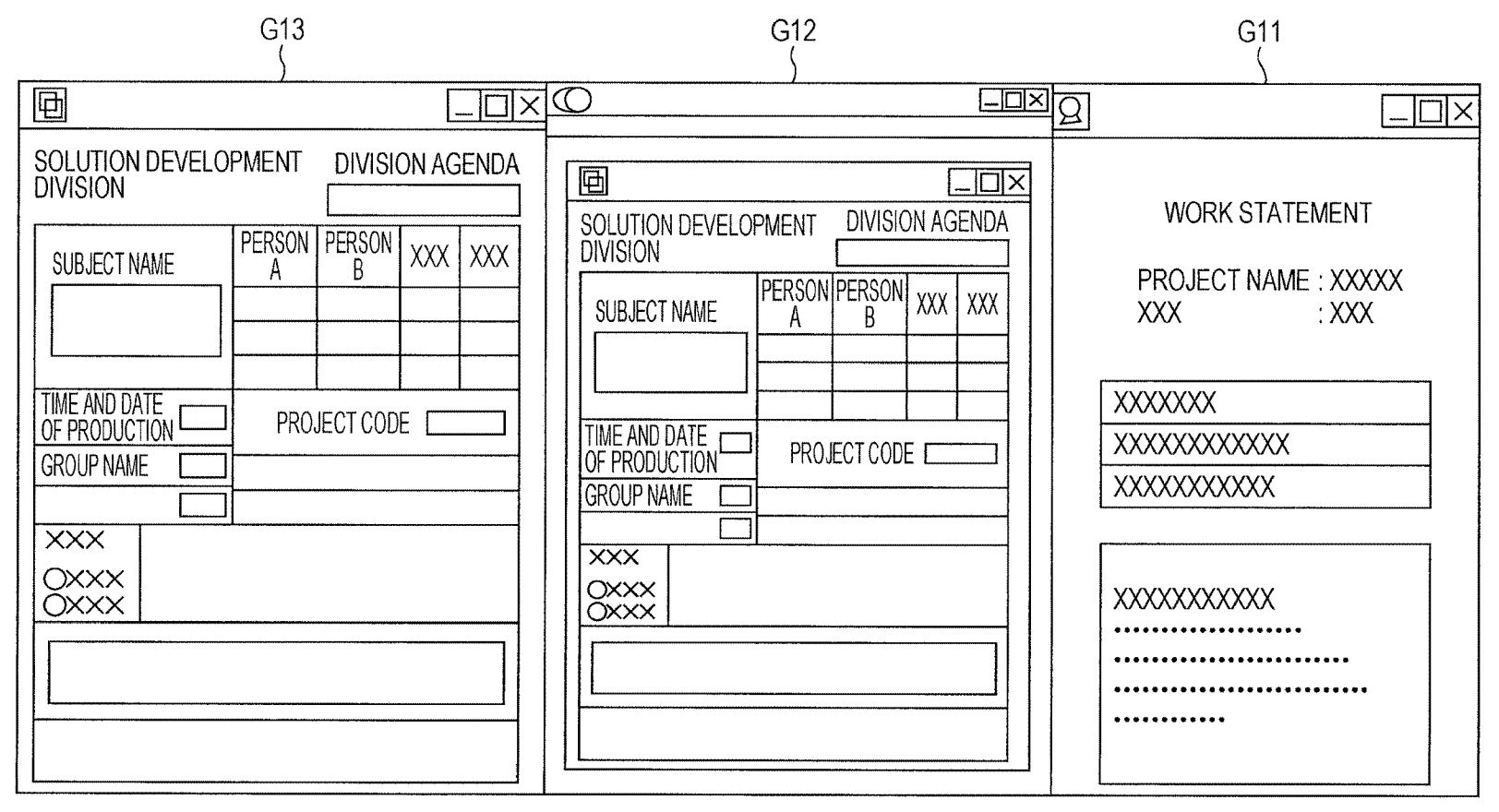

FIG. 13 illustrates an example of a screen displayed on the UI unit 156. When the user performs an operation to open a file as illustrated in FIG. 13, the document handling system 102 opens a file G11 selected by the user while displaying a screen shot G12 associated with the file G11. The document handling system 102 displays on the UI unit 156 a system operation screen G13 that is obtained by accessing the URL attached to the screen shot.

In accordance with the exemplary embodiment as described above, when the user suspends the job by closing the file in the work space section 103, the screen shot of the system operation screen at the timing of the suspension is associated with the file and then stored. When the user resumes the job by opening the file again, the screen shot associated with the file is displayed. In this way, the display status on which the user has performed the job using the file is reproduced, and the user remembers what job he or she has performed on what operation screen using the file.

When the document handling system 102 displays the screen shot in the exemplary embodiment, the system operation screen obtained by accessing the URL attached to the screen shot is also displayed together. In this way, the user, when resuming the job, is free from performing an operation to display the system operation screen again.

Operation Example 2

An operation example 2 is described below. In the operation example 2, a process of FIG. 14 is performed in place of the process of FIG. 10 of the operation example 1, and a process of FIG. 15 is performed in place of the process of FIG. 12 of the operation example 1.

Figure 14:
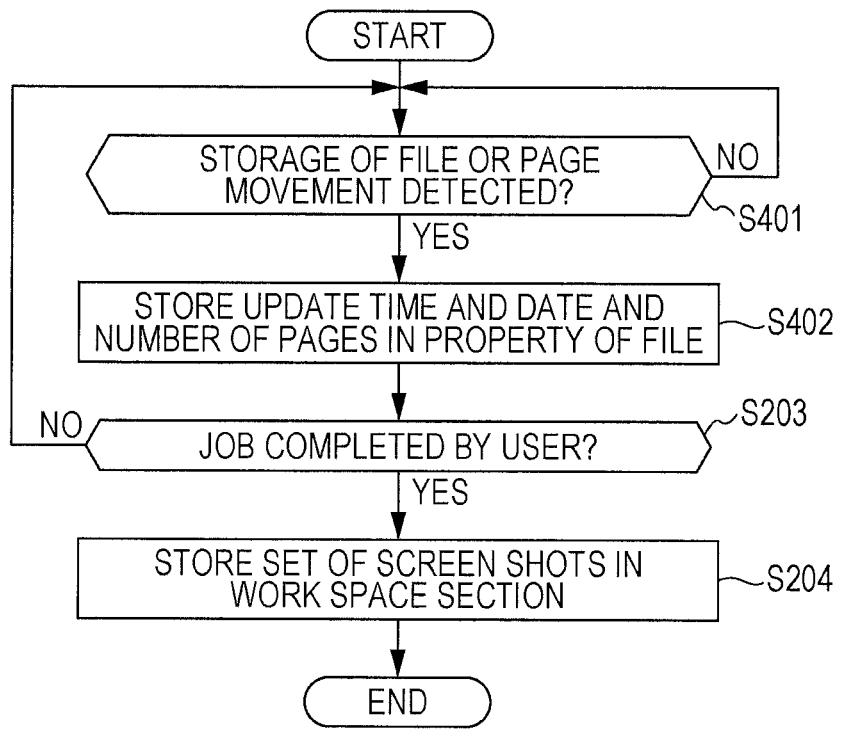
FIG. 14 is a flowchart illustrating a storage process of a file.

FIG. 14 is a flowchart illustrating a storage process of a file to be performed by the document handling system 102. The process of FIG. 14 is different from the process of FIG. 10 in that the operation in step S201 is replaced with an operation in step S401 and that the operation in step S202 is replaced with an operation in step S402. In step S401, the document handling system 102 determines whether the storage of the file or the transition between pages in the file has been detected. More specifically, the user opens a file (such as a document file) in the work space section 103, and each time a page in the open file is changed to another page, the transition is detected by the document handling system 102. If the storage of the file or the transition between pages in the file has been detected, the document handling system 102 proceeds to step S402.

In step S402, the document handling system 102 stores the property of the file with the time information indicating the update time and date attached thereto. When the transition between pages is detected, the document handling system 102 stores information indicating the page prior to the transition with the time information indicating the update time and date associated therewith.

Figure 15:
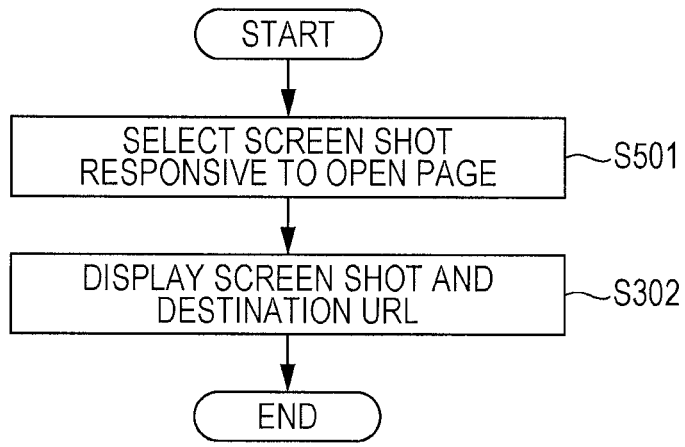
FIG. 15 is a flowchart illustrating a display process of the screen shot.

FIG. 15 is a flowchart illustrating a process that is performed when the job resumes. The process of FIG. 15 is triggered by the opening of a file in the work space section 103. The process of FIG. 15 is also performed when a page of a displayed file is changed to another page. The process of FIG. 15 is different from the process of FIG. 12 in that an operation in step S301 is replaced with the operation in step S501. In step S501, the document handling system 102 compares the update time and date of the page of the open file with the production time and date of the screen shot stored on the work space section 103, and selects the screen shot having a time difference therebetween satisfying a predetermined condition. For example, the document handling system 102 may select the screen shot with the production time and date of the displayed page having a minimum difference from the update time and date of the displayed page.

When the user opens a file in the work space section 103 to resume the job in this operation example, the screen shot responsive to the page of the displayed file is displayed. When the page to be displayed in the displayed file is changed to another page, the screen shot displayed is updated along with the page transition. In this way, the state of the display in which the user has performed the job is reproduced by opening the page of the file.

Modifications

The exemplary embodiment is one of the exemplary embodiments of the present invention, and may be modified as described below. The exemplary embodiment and modifications described below may be combined as appropriate.

First Modification

In accordance with the exemplary embodiment, the document handling system 102 acquires the screen shot when the updating of the system operation screen has been detected. The acquiring of the screen shot is not limited to this timing. For example, the document handling system 102 may acquire the screen shot when the system operation screen is closed. In another example, the document handling system 102 may acquire the screen shot each time screen shifting from one screen to another on the system operation screen is detected. In yet another example, the document handling system 102 may acquire the screen shot of the system operation screen at the timing when the updating of the local operation screen is detected. More specifically, when a specific button of a toolbar displayed on the local operation screen is pressed, or when a predetermined annotation is added to a document file included in the work space section 103, the document handling system 102 may acquire the screen shot of the system operation screen.

While the local operation screen is displayed on the UI unit 156, the document handling system 102 may acquire and store the screen shot on the work space section 103 at every predetermined timing. More specifically, the document handling system 102 periodically performs a polling operation to acquire the screen shot.

Second Modification

In the exemplary embodiment, the document handling system 102 stores the time information indicating the production time and date and the URL on the property of the screen shot. The storage of the time information indicating the production time and date and the URL on the screen shot is not limited to this method. For example, a database configured to store the production time and date and the URL of the screen shot may be arranged, and the document handling system 102 may store the production time and date and the URL on this database.

In accordance with the exemplary embodiment, the document handling system 102 includes the time information indicating the update time and date in the property of the document file. The storage of the information concerning the update time and date of the file is not limited to this method. For example, a database configured to store the update time and date of the file may be arranged, and the document handling system 102 may store the information indicating the update time and date on the database.

Third Modification

With reference to step S204 of FIG. 8, the document handling system 102 stores a set of screen shots on a memory area allocated to the work space section 103. The storing of the screen shot is not limited to this timing. For example, each time the screen shot is acquired, the document handling system 102 may store the acquired screen shot on the work space section 103 without storing the screen shot on a temporary storage area.

Fourth Modification

In accordance with the exemplary embodiment, the storage time and date of the file is compared with the production time and date of the screen shot to determine the correspondence relationship therebetween. The association between the file and the screen shot is limited to this method. For example, the document handling system 102 may store on a predetermined database an identifier identifying the file and an identifier identifying the screen shot in association with each other. Any storage method is acceptable as long as the file is associated with the screen shot.

Fifth Modification

In accordance with the exemplary embodiment, the screen shot is displayed when a file in the work space section 103 is opened. The displaying of the screen shot is not limited to this timing. For example, when the local operation screen is opened, the document handling system 102 may display the screen shot and the file. In another example, the document handling system 102 may display the screen shot and the file at the timing when a folder included in the work space section 103 is opened.

Sixth Modification

In accordance with the exemplary embodiment, when the screen shot is displayed, the document handling system 102 displays an actual system operation screen together by accessing the URL. Alternatively, the screen shot and the file may be displayed together. In other words, the system operation screen that is acquired by accessing the URL may not necessarily be displayed.

Seventh Modification

In accordance with the exemplary embodiment, the number of files with the screen shot associated therewith is not limited to one. Multiple files may be associated with the single screen shot. This is not limited to the files. One or more folders may be associated with the screen shot.

If there are multiple work spaces, a set of screen shots may be collectively stored on a memory area instead of the case that the screen shots are respectively stored on the work spaces. More specifically, a screen shot does not have to be stored on a per work space basis. In this case, the document handling system 102 stores on the work space section 103 the storage destination and a file name of the screen shot instead of performing an operation to store the set of screen shots on the work space section 103 (the operation in step S204 of FIG. 8). To store the storage destination and the file name, the document handling system 102 may describe the storage destination and the file name in a predetermined setting file. Alternatively, a database configured to store the storage destination and the file name may be arranged.

When the user resumes the job in this modification, the document handling system 102 acquires the storage destination and the file name of the screen shot associated with the file or folder selected by the user, and reads and displays the screen shot using the acquired storage destination and file name.

Eighth Modification

In accordance with the exemplary embodiment, the digital document converter 104 in the document handling system 102 acquires the screen shot of the system operation screen. The element configured to acquire the screen shot is not limited to the digital document converter 104. For example, the work space section 103 may acquire the screen shot of the system operation screen.

In accordance with the exemplary embodiment, the document handling system 102 acquires the screen shot of the display region of the system operation screen. The display region from which the screen shot is acquired is not limited to this region. For example, the screen shot of the entire display region of the UI unit 156 may be acquired.

Ninth Modification

In accordance with the exemplary embodiment, the program executed by the CPU 151 in the client apparatus 10 may be downloaded via a communication network, such as the Internet. The program may also be distributed in a recorded form on one of computer-readable recording media, including a magnetic recording medium (such as a magnetic tape, or a magnetic disk), an optical recording medium (such as an optical disk), a magneto-optical recording medium, and a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus comprising:
a display; and
a processor programmed to:
    display, on a first display region of the display, an operation screen for an operation of another apparatus connected to the data processing apparatus via a network;
    display, on a second display region of the display an operation screen for operating a first object selected from a set of at least one object related to the operation of the another apparatus;
    store on a memory at a predetermined timing an image of the operation screen displayed on the first display region in association with the first object; and
    when a predetermined operation is performed on the first object or the set, display on the display the image of the operation screen previously stored on the memory in association with the first object.

2. The data processing apparatus according to claim 1, wherein the processor is programmed to:
    when the operation screen for operating the first object is closed on the second display region, store on the memory the image of the operation screen displayed on the first display region in association with the first object.

3. The data processing apparatus according to claim 1, wherein the processor is programmed to:
    when the operation screen for operating the first object is closed on the first display region, store on the memory the image of the operation screen in association with the first object.

4. The data processing apparatus according to claim 1, wherein the processor is programmed to:
    while the operation screen for operating the first object is displayed on the second display region, store on the memory at each predetermined timing the image of the operation screen displayed on the first display region in association with the first object.

5. The data processing apparatus according to claim 1, wherein the set is stored on the memory.

6. The data processing apparatus according to claim 2, wherein the set is stored on the memory.

7. The data processing apparatus according to claim 3, wherein the set is stored on the memory.

8. The data processing apparatus according to claim 4, wherein the set is stored on the memory.

9. The data processing apparatus according to claim 1, wherein the processor is programmed to:
    when the first object is selected from the set, display, on the display the image of the operation screen previously stored on the memory in association with the first object.

10. The data processing apparatus according to claim 2, wherein the processor is programmed to:

when the first object is selected from the set, display, on the display the image of the operation screen previously stored on the memory in association with the first object.

11. The data processing apparatus according to claim 3, wherein the processor is programmed to:
when the first object is selected from the set, display, on the display the image of the operation screen previously stored on the memory in association with the first object.

12. The data processing apparatus according to claim 4, wherein the processor is programmed to:
when the first object is selected from the set, display, on the display the image of the operation screen previously stored on the memory in association with the first object.

13. The data processing apparatus according to claim 5, wherein the processor is programmed to:
when the first object is selected from the set, display, on the display the image of the operation screen previously stored on the memory in association with the first object.

14. The data processing apparatus according to claim 1, wherein:
the set comprises an image object that instructs the operation of the another apparatus to be performed on the at least one object.

15. The data processing apparatus according to claim 2, wherein:
the set comprises an image object that instructs the operation of the another apparatus to be performed on the at least one object.

16. The data processing apparatus according to claim 1, wherein the processor is programmed to:
store an address responsive to the operation screen displayed on the first display region in association with the first object; and
display on the display an operation screen, obtained by accessing the address associated with the first object, together with the first object and the image of the operation screen previously stored on the memory in association with the first object.

17. The data processing apparatus according to claim 4, wherein the processor is programmed to:
store on the memory the image of the operation screen displayed on the first display region with time information attached thereto, and information indicating update time of the first object; and
display on the display an image of the operation screen previously stored on the memory in association with the first object with the time information attached thereto, the time information having a time difference from the update time of the first object equal to or shorter than a predetermined threshold value.

18. The data processing apparatus according to claim 4, wherein the processor is programmed to:
store on the memory the image of the operation screen displayed on the first display region with time information attached thereto, and information indicating update time of each page of the first object; and
display on the display an image of the operation screen previously stored on the memory in association with the first object with the time information attached thereto, the time information having a time difference from the update time of a page that is to be displayed in the first object equal to or shorter than a predetermined threshold value.

19. A data processing method of a data processing apparatus comprising:
displaying on a first display region of a display an operation screen for an operation of another apparatus connected to the data processing apparatus via a network;
displaying on a second display region of the display an operation screen that operates a first object selected from a set of at least one object related to the operation of the another apparatus;
storing on a memory at a predetermined timing an image of the operation screen displayed on the first display region in association with the first object; and
when a predetermined operation is performed on the first object or the set, displaying on the display the image of the operation screen previously stored on the memory in association with the first object.

20. A non-transitory computer readable medium storing a program causing a computer to execute a process for processing data, the process comprising:
displaying, on a first display region of a display, an operation screen for an operation of another apparatus connected to the computer via a network;
displaying on a second display region of the display an operation screen that operates a first object selected from a set of at least one object related to the operation of the another apparatus;
storing on a memory at a predetermined timing an image of the operation screen displayed on the first display region in association with the first object; and
when a predetermined operation is performed on the first object or the set, displaying on the display the image of the operation screen previously stored on the memory in association with the first object.

* * * * *